United States Patent
Khaldoun

(10) Patent No.: US 9,450,835 B2
(45) Date of Patent: Sep. 20, 2016

(54) METHOD FOR TURNING OFF ROUTERS IN A COMMUNICATIONS NETWORK AND ROUTER IMPLEMENTING THIS METHOD

(75) Inventor: Al Agha Khaldoun, Paris (FR)

(73) Assignees: Universite Paris—Sud 11, Paris (FR); Centre National de la Recherche Scientifique, Paris (FR)

( * ) Notice: Subject to any disclaimer, the term of this patent is extended or adjusted under 35 U.S.C. 154(b) by 190 days.

(21) Appl. No.: 14/129,083

(22) PCT Filed: Jun. 28, 2012

(86) PCT No.: PCT/EP2012/062550
§ 371 (c)(1),
(2), (4) Date: Apr. 21, 2014

(87) PCT Pub. No.: WO2013/000996
PCT Pub. Date: Jan. 3, 2013

(65) Prior Publication Data
US 2014/0293805 A1    Oct. 2, 2014

(30) Foreign Application Priority Data

Jun. 28, 2011 (FR) ..................... 11 55729

(51) Int. Cl.
*H04L 12/28* (2006.01)
*H04L 12/24* (2006.01)
*H04L 12/10* (2006.01)
(Continued)

(52) U.S. Cl.
CPC ............... *H04L 41/32* (2013.01); *H04L 12/10* (2013.01); *H04L 45/02* (2013.01); *H04L 45/70* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,055,641 A | * | 4/2000 | Konaka | G06F 1/3209 713/300 |
| 7,542,437 B1 | * | 6/2009 | Redi | H04W 52/0206 370/311 |
| 8,185,767 B2 | * | 5/2012 | Ballou | H04L 12/10 713/300 |

(Continued)

FOREIGN PATENT DOCUMENTS

| | | |
|---|---|---|
| JP | 2005-515696 A | 5/2005 |
| JP | 2011087043 A | 4/2011 |
| JP | 2012-093870 A | 5/2012 |

OTHER PUBLICATIONS

Search Report dated Aug. 6, 2012 for International Patent Application No. PCT/EP2012/062550.

(Continued)

*Primary Examiner* — Frank Duong
(74) *Attorney, Agent, or Firm* — Baker & Hostetler LLP

(57) ABSTRACT

A method for turning off routers, operating according to a link-state protocol, in a communications network, said network linking a plurality of devices, said method being executed simultaneously over a plurality of routers of the network, includes: a step of initializing; a step of monitoring verifying a list of predefined conditions to be met to allow the turning off of the router; a step of waiting; a step of turning off, including the transmission of a message destined for other routers executing said method to signal the turning off of said router to them; the waiting step being carried out before the turning-off step, the turning-off step being carried out only if no turning-off message originating from other routers is received during the waiting step, if a turning-off message coming from other routers is received during the waiting step then the return to the monitoring step.

7 Claims, 3 Drawing Sheets

(51) Int. Cl.
*H04L 12/721* (2013.01)
*H04L 12/751* (2013.01)

(56) References Cited

U.S. PATENT DOCUMENTS

2007/0195784 A1    8/2007   Allen et al.
2008/0307075 A1*  12/2008   Urano .................... G04G 5/002
                                                                 709/220
2010/0085903 A1    4/2010   Pandey et al.
2011/0002338 A1    1/2011   Yamada et al.

OTHER PUBLICATIONS

Refusing Reason Notice issued in JP Patent Application No. 2014-517698 mailed Jun. 14, 2016. This document recites 5 references including JP2011015310.

* cited by examiner

METHOD FOR TURNING OFF ROUTERS IN A COMMUNICATIONS NETWORK AND ROUTER IMPLEMENTING THIS METHOD

CROSS-REFERENCE TO RELATED APPLICATIONS

This application is a National Stage of International patent application PCT/EP2012/062550, filed on Jun. 28, 2012, which claims priority to foreign French patent application No. FR 1155729, filed on Jun. 28, 2011, the disclosures of which are incorporated by reference in their entirety.

FIELD OF THE INVENTION

The invention lies in the field of Internet telecommunications networks and particularly the reduction of energy consumption in these networks.

BACKGROUND

In telecommunications networks such as the Internet, data between two devices of the network are transmitted in the form of messages divided into separately transmitted packets. Each packet includes a header, comprising useful information for forwarding it and reconstituting the message, and encapsulates part of the data.

A router is an element of the network ensuring the routing of the packets. Generally, these devices keep a table, called routing table, in which the best routes to the various nodes of the network are memorized, via metrics associated with these routes.

Routing is the method making it possible to select paths in the network for forwarding packets from a sender to one or more destinations.

One way of limiting energy losses in these networks is to switch off the devices that are of little or no use to the operation of the network.

Algorithms making it possible to switch off network devices are already known. However, these algorithms are based on the election of a super node (also called master) which orders a synchronization and sends orders to the neighboring devices. These algorithms therefore exhibit the drawback of only operating in a synchronized manner and require that the devices have a direct physical link with the master. Moreover, they can only operate with a limited number of devices and are not adapted to an increase in the number of devices in the network. One example is the patent application US20080307075 disclosing a method for deactivating nodes of a network and requiring synchronization between these nodes.

SUMMARY OF THE INVENTION

The invention aims to alleviate the aforementioned problems by proposing a method for turning off routers in a communications network making it possible to reduce the energy consumption of a network by turning off the routers that are not useful for the network while removing the synchronization constraints between these routers.

With this aim, the subject of the invention is a method for turning off routers, operating according to a link-state protocol, in a communications network, said network linking a plurality of devices, said method being executed simultaneously over a plurality of routers of the network and including:

a step of initializing the router,
a step of monitoring verifying a list of predefined conditions to be met to allow the turning off of the router,
a step of waiting,
a step of turning off, including the transmission of a message destined for other routers executing said method to signal the turning off of said router to them, the waiting step being carried out before the turning-off step, the turning-off step being carried out only if no turning-off message originating from other routers is received during the waiting step, and if at least one of the following conditions is verified. These conditions are that the router is not in the process of transferring traffic and/or that the router is not executing other applications and/or turning off the router does not lead to the disconnection of at least one of the devices. In order to verify this last condition, (turning off the router does not lead to the disconnection of at least one of the devices of the network) the following steps are used:

a step of determining a graph representing the topology of the network using information resulting from the link-state protocol, the graph including nodes representing the devices and links representing the connections between the devices,
a step of selecting a neighbor node to the node representing the router,
a step of depth searching, from the selected neighbor node, the graph of the network from which the node representing the router was previously withdrawn,
a step of verifying that all the nodes are accessible from the neighbor node.

If the verification step is valid then said condition according to which turning off the router does not lead to the disconnection of at least one of the devices is verified, otherwise the condition according to which turning off the router does not lead to the disconnection of at least one of the devices is not verified. If a turning-off message coming from other routers is received during the waiting step then a return to the monitoring step is carried out.

Advantageously, the method furthermore comprises an additional waiting step the duration of which can be parameterized, intended to take into account the propagation time of the messages in the network.

Advantageously, the duration of the waiting step is determined according to a pseudo-random method, so as to avoid several routers being turned off simultaneously.

Advantageously, the duration of the waiting step can be parameterized as a function of the quality of service of the router on which the method is executed; the higher the quality of service of the router, the longer the duration of the waiting step.

Advantageously, the quality of service of the router is evaluated from at least one characteristic chosen from the following: the speed, the delay or the security level of the router.

The invention also relates to a router characterized in that it comprises means for implementing the method according to the invention.

The invention also relates to a telecommunications network characterized in that it includes at least one router according to the invention.

The invention has the advantage of allowing a fairly large saving of energy which can enable several degrees of magnitude to be gained as a function of the activity of the network. A turned-on router consumes between 5 and 200 watts. A router in sleep mode consumes a few milliwatts. A router in hibernation consumes 0 watts.

Even if it has no traffic to send, a turned-on router consumes energy and sends fairly large items of signaling information. If it is not in use, turning it off can reduce the network consumption by a large amount.

Moreover, a turned-on router shares its bandwidth with other routers, thereby reducing their speeds. Turning it off increases their speed, and consequently they will consume less energy to send the same information.

At a time of little work (night-time for example), the invention can lower energy consumption leading to a gain of up to 99%.

Moreover, the use of a method distributed over the routers makes it possible to easily increase the number of routers in the network without reducing the performance of the method.

In a preferred embodiment, each router can acquire the link states of the network nodes by a routing protocol. This state gives it the possibility to build a map of its network with the connections between the nodes and their quality. This method then enables the router to decide, alone and without consulting any central element, to turn itself off in order to save energy. This decision is taken according to the state of the traffic and the role of the node in the network connectivity. The router turns itself on again by various mechanisms in order to test its usefulness in the network again.

BRIEF DESCRIPTION OF THE DRAWINGS

The invention will be better understood and other advantages will appear on reading the detailed description, given by way of nonlimiting example and using the figures among which.

DETAILED DESCRIPTION

Let us consider a telecommunications network that uses a TCP/IP protocol stack. This is a set of protocols offering a certain number of functionalities, including routing. Routing is the function that enables a packet to leave from a source point towards a destination point, going by intermediate points. The route is a concatenation of physical links connecting the various nodes of the network. Routing consists in associating physical links to form the route.

Figure 1A:
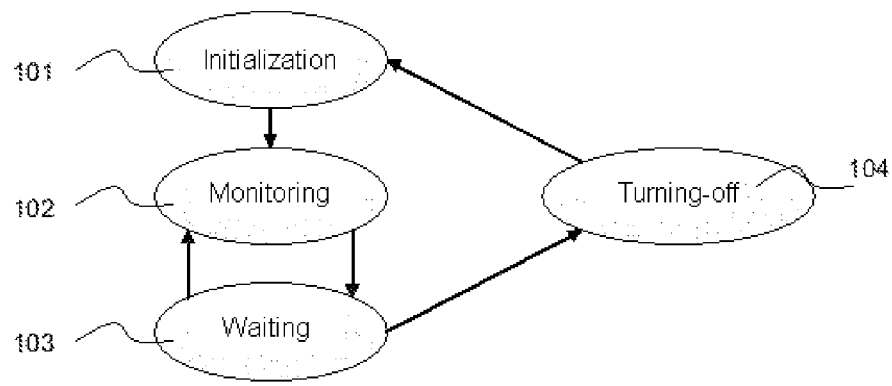
FIGS. 1a and 1b each represent a diagram of an embodiment of the method according to the invention.

FIG. 1a shows a diagram of the method according to the invention. The method includes a step of initialization 101 during which the router does nothing for a first duration D1, then the activity of the router (demon) is started. Once the demon is launched, the method proceeds to a monitoring step 102.

The monitoring step 102 comprises the verification of the state of the router on which the method is executed, of the network and of the traffic. The verification is carried out at regular intervals over a second duration D2 (for example expressed in milliseconds). If this verification estimates that the machine must go into sleep mode, the method proceeds to a waiting step 103.

The aim of the monitoring step 102 is to measure a utility function of the router. If the utility of the router is low, the router is turned off then is turned on again either on request, or periodically to measure its utility function again. The overall goal is to consume as little energy as possible for the operation of the network.

The waiting step 103 comprises a state of waiting for a third duration D3 that can be parameterized and situated between a minimum limit and a maximum limit. The step 103 furthermore comprises, at the end of this wait, a new verification (the same as that in the monitoring step 102.) If the situation has not changed (the router must enter sleep mode) then the method proceeds to a turning-off step 104. Otherwise, the method proceeds to the monitoring step 102 again.

Advantageously, the third duration D3 is determined in a pseudo-random manner. The use of a pseudo-random value makes it possible to desynchronize the routers. It then becomes highly improbable that two identical routers are simultaneously executing the last verification of the waiting step 103. Indeed, one of the difficulties in the use of a distributed algorithm is that, by definition, a central entity enabling coordination of the routers does not exist. However, it is important that two routers cannot simultaneously execute the last verification because this can have the consequence that these two routers consider each other as not having been turned off and both switch to the turning-off step 104, leading for example to the disconnection of a device of the network.

If, during the waiting step 103, the router receives a turning-off message from another router, the method proceeds to the monitoring step 102 again.

The turning-off step 104 sends a turning-off message to all the other routers of the network, then stops the demon and puts the machine into sleep mode for a fourth duration D4. The turning-off step 104 corresponds to a state where the routing service is deactivated, the router is in sleep mode and its electrical consumption is very low. On leaving sleep mode, the machine goes through the initialization step 101.

The following values are given by way of example:
second duration D2: 10,000 ms,
minimum limit of the third duration D3: 5,000 ms,
maximum limit of the third duration D3: 15,000 ms
first duration D1: 2 s,
fourth duration D4: 40 s.

If the router possesses mechanisms for turning on request (Wake on LAN), in this case, the fourth duration D4 is infinite. The waking is controlled by an outside source. Otherwise, the router remains asleep. Waking on demand signifies that the router is woken by an independent event when it is needed, by being sent an interruption for example.

Figure 1B:
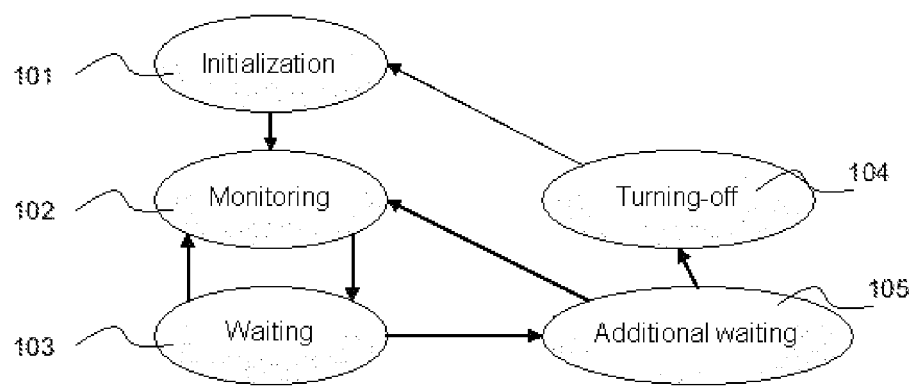

In a preferred embodiment, presented in FIG. 1b, the method furthermore comprises an additional waiting step 105 before proceeding to the turning-off step 104. This step 105 has the aim of compensating for the propagation time of messages in the network. This step comprises a state of waiting during a delay lasting for a fifth duration D5 before putting itself into sleep mode. The fifth duration D5 can for example be of 10 ms. If during this delay the router receives a turning-off message from another router, the method proceeds with the monitoring step 102 again.

Advantageously, the list of predefined conditions to be met to allow the router to be turned off comprises at least one of the following conditions:
the router is not in the process of transferring traffic, in the opposite case the router being useful and routing the information packets towards the nodes of the network.

the router does not execute any other applications, in the opposite case turning the router off would trigger the unexpected cessation of said application, turning the router off does not lead to the disconnection of at least one of the devices of the network.

The two first conditions are relatively easy to verify. Locally it is enough to test a few parameters and to verify a few tables to be sure that the router is not in the process of routing traffic or that there are applications other than routing being executed on the router.

The third condition is more complicated to verify. We are seeking to determine whether the router is an articulation point of the network, in other words, if when the router is turned off, it prevents the routing of the information towards at least one device of the network. However, in many networks, several routes exist for joining source points to destination points. It is then suitable to search the graph of the network to ascertain whether turning it off will disturb the connectivity of any node of the network.

The verification of the condition according to which turning off the router does not lead to the disconnection of at least one of the devices of the network is based on the use of a link-state protocol. OSPF (Open Shortest Path First) for wired networks or OLSR (Optimized Link State Routing) for ad hoc and wireless networks are robust examples of link-state protocols. In a routing method based on link states, each router discovers its environment locally by communicating with its neighbors. This communication allows it to discover its neighbors and the link state that connects it to its neighbors. After this discovery, the router broadcasts topology messages to the whole network to announce its neighborhood with the link state. Thus, all the routers know the neighbors of all the other routers, which is enough to define the topology of the network. Thus, all the routers of the network can produce the topology of the network from this information, and can calculate a route towards all the destinations. The routing information is then stored in a table that is used to transfer the traffic of the information.

The verification of this condition can be carried out in the following way, for example. Using a link-state protocol, a router in a network recovers the graph of the network. This graph contains the topology of the network where the nodes represent devices or routers and the links of the connections between these devices or routers. The router withdraws its existence from the graph then randomly selects one of its neighbors then applies an algorithm for depth search of the graph (also called DFS or Depth First Search) well known to the prior art. If this neighbor can then reach all the other nodes of the network, the router is not useful and can be turned off; in the opposite case it remains turned on.

Figure 2:
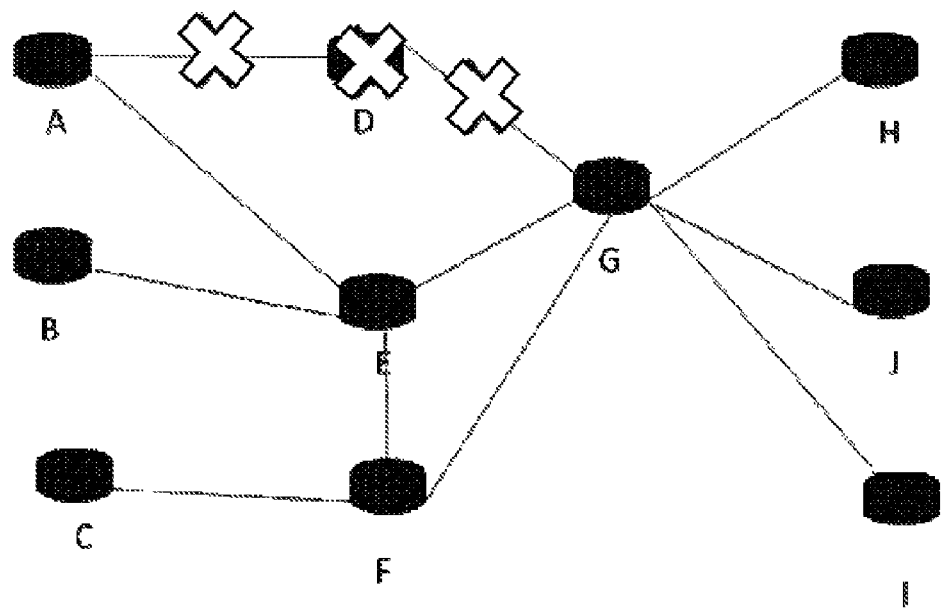
FIGS. 2 and 3 show an example of a network including a plurality of devices.

FIG. 2 shows an example of a network including a plurality of devices (A, B, C, D, E, F, G, H, J and I) including four routers (D, E, F and G) linking terminal nodes (A, B, C, H, J and I). In this figure, it is supposed that the method verifies whether the third condition is met for the router D. The verification includes a depth search representing the network from which the node D has been withdrawn (the withdrawal is symbolized by crosses on the node and the associated links), from a neighbor node of the node D (A or G). In this example, the depth search from A or G reaches all the nodes. This signifies that the router D meets the third condition.

Figure 3:
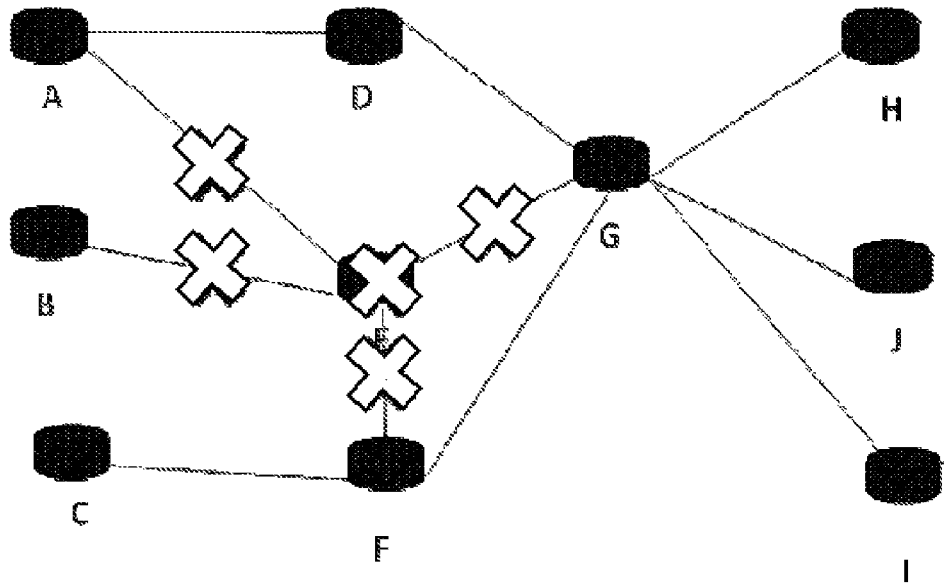

FIG. 3 shows the same example network as FIG. 2. In this figure, it is supposed that the method verifies whether the third condition is met for the router E. The verification includes a depth search of the graph representing the network from which the node E has been withdrawn (the withdrawal is symbolized by crosses on the node and the associated links), from a neighbor node of the node E (A, B, F or G). In this example, the depth search from A, B, F or G never reaches all the nodes. For example, from node A it is not possible to reach the node B. This signifies that the router E does not meet the third condition and that it cannot be turned off.

In a preferred embodiment, the value of the waiting step depends on the importance of a router with respect to another regarding the quality of service offered by the network. This parameterization is done for example by calculating a maximum value for the waiting duration. The determination of the duration of the waiting step is then done over a larger maximum value for the router that offers the lower quality of service. It is thus more likely that the router offering the better quality of service has a longer waiting duration than the other router, which will lead to the other router being turned off.

The quality of service can take into account one of the following parameters: the speed, the delay, the security level of the router, or a combination of these parameters. This parameterization is based for example on the link-state protocol where the values of the metrics are communicated in the topological messages.

Figure 4:
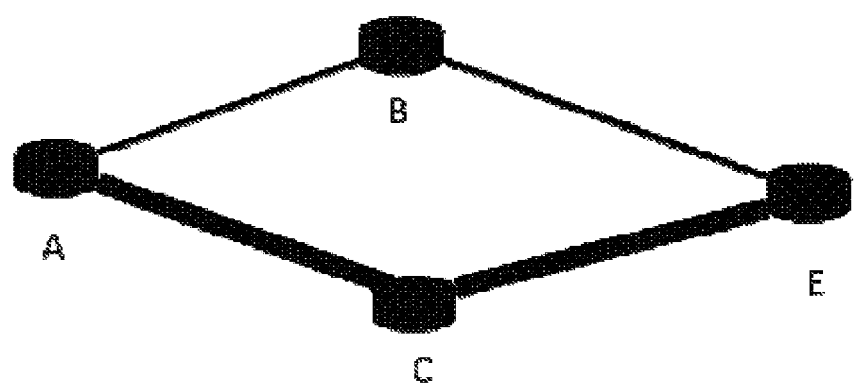
FIG. 4 shows another example of a network including a plurality of devices.

FIG. 4 shows another example of a network including a plurality of devices (A, B, C and E) including two routers (B and C) linking terminal nodes (A and E). It is supposed that the width of the links linking the devices is proportional to their bandwidth.

The router C offers a better bandwidth than the router B. Therefore, the maximum limit of the third duration D3 for the router C will be greater than the maximum limit of the third duration D3 for the router B. The router B will thus have a high probability of being turned off before the router C.

For example, if the bandwidth offered by C is three times greater than that offered by B, it would be advisable to generate the third duration D3 of B randomly between 0 and three times less than the maximum limit of the third duration D3 for the router C. If the third duration D3 of C is chosen randomly between 0 and 9, the third duration D3 of B should be chosen between 0 and 3. In this configuration, B has a higher probability of being turned off before C, the turning-off occurring after a waiting duration equal to the third duration D3.

Figure 5:
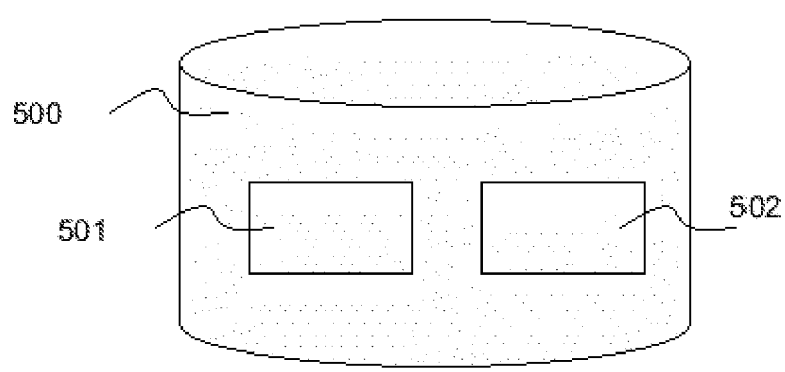
FIG. 5 shows an example of a router according to the invention.

The invention also relates to a router comprising means for implementing the method according to the invention. These implementing means can be software, produced for example in the form of a demon executable by the router. These implementing means can also be hardware, for example in the form of a programmable electronic chip of ASIC or FPGA type, programmed to execute the method according to the invention. FIG. 5 shows an example of a router 500 according to the invention. The router includes means for implementing the routing service 501, for example in the form of a first demon, and means for implementing the method according to the invention 502 in the form of a second demon. The router comprises a memory and a processor (not represented) capable of executing the demons 501 and 502.

The invention also relates to a telecommunications network including a plurality of routers according to the invention. The routers are interlinked by way of wired or wireless connections.

The invention claimed is:

1. A method for turning off routers, operating according to a link-state protocol, in a communications network, said network linking a plurality of devices, said method being executed simultaneously over a plurality of routers of the network and including:
- a step of initializing,
- a step of monitoring verifying a list of predefined conditions to be met to allow the turning off of the router,
- a step of waiting,
- a step of turning off, including a transmission of a message destined for other routers executing said method to signal the turning off of said router to the other routers,
- the waiting step being carried out before the turning-off step, the turning-off step being carried out only if no turning-off message originating from other routers is received during the waiting step, and if at least one of the following conditions is verified:
  - the router is not in the process of transferring traffic,
  - the router is not executing other applications, or
  - turning off the router does not lead to a disconnection of at least one of the devices,
- a verification of the condition according to which turning off the router does not lead to the disconnection of at least one of the devices of the network includes:
  - a step of determining a graph representing a topology of the network using information resulting from the link-state protocol, the graph including nodes representing the devices and links representing connections between the devices,
  - a step of selecting a neighbor node to a node representing the router,
  - a step of depth searching, from the selected neighbor node, the graph of the network from which the node representing the router was previously withdrawn,
  - a step of verifying that all the nodes are accessible from the neighbor node,
- if said verification step is valid then said condition according to which turning off the router does not lead to the disconnection of at least one of the devices is verified, otherwise the condition according to which turning off the router does not lead to the disconnection of at least one of the devices is not verified; and
- if a turning-off message coming from other routers is received during the waiting step, then a return to the monitoring step is carried out.

2. The method as claimed in claim 1, further comprising an additional waiting step, the duration of which is parameterized, intended to take into account the propagation time of the messages in the network.

3. The method as claimed in claim 1, in which the duration of the waiting step is determined according to a pseudo-random method, so as to avoid several routers being turned off simultaneously.

4. The method as claimed in claim 1, in which the duration of the waiting step is parameterized as a function of the quality of service of the router on which the method is executed; and the higher the quality of service of the router, the longer the duration of the waiting step.

5. The method as claimed in claim 4, in which the quality of service of the router is evaluated from at least one characteristic chosen from the following: a speed, a delay or a security level of the router.

6. A router configured to operate according to a link-state protocol, in a communications network, the network linking a plurality of devices, comprising:
- the router configured to implement a step of initializing,
- the router configured to implement a step of monitoring verifying a list of predefined conditions to be met to allow the turning off of the router,
- the router configured to implement a step of waiting,
- the router configured to implement a step of turning off, including a transmission of a message destined for other routers to signal the turning off of said router to the other routers,
- wherein the waiting step being carried out before the turning-off step, the turning-off step being carried out only if no turning-off message originating from other routers is received during the waiting step, and if at least one of the following conditions is verified:
  - the router is not in the process of transferring traffic,
  - the router is not executing other applications, or
  - turning off the router does not lead to a disconnection of at least one of the devices,
- the router configured to implement a verification of the condition according to which turning off the router does not lead to the disconnection of at least one of the devices of the network includes:
  - a step of determining a graph representing a topology of the network using information resulting from the link-state protocol, the graph including nodes representing the devices and links representing connections between the devices,
  - a step of selecting a neighbor node to a node representing the router,
  - a step of depth searching, from the selected neighbor node, the graph of the network from which the node representing the router was previously withdrawn,
  - the router configured to implement a step of verifying that all the nodes are accessible from the neighbor node,
- the router configured to determine if said verification step is valid then said condition according to which turning off the router does not lead to the disconnection of at least one of the devices is verified, otherwise the condition according to which turning off the router does not lead to the disconnection of at least one of the devices is not verified; and
- the router configured to determine if a turning-off message coming from other routers is received during the waiting step, then a return to the monitoring step is carried out.

7. A telecommunications network comprising a plurality of routers as claimed in claim 6.

* * * * *